US012616190B2

(12) United States Patent
Tilley et al.

(10) Patent No.: US 12,616,190 B2
(45) Date of Patent: May 5, 2026

(54) SYSTEM AND METHOD FOR VENTILATING AN ORGAN

(71) Applicant: DEKA Products Limited Partnership, Manchester, NH (US)

(72) Inventors: Michael C. Tilley, Amherst, NH (US); Steven L. Henning, Manchester, NH (US); Joshua Filgate, Lyndeborough, NH (US); Stuart A. Jacobson, Lexington, MA (US); Daniel S. Karol, Manchester, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 922 days.

(21) Appl. No.: 17/883,106

(22) Filed: Aug. 8, 2022

(65) Prior Publication Data

US 2023/0043364 A1    Feb. 9, 2023

Related U.S. Application Data

(60) Provisional application No. 63/260,097, filed on Aug. 9, 2021.

(51) Int. Cl.
*A01N 1/122*        (2025.01)
*A01N 1/143*        (2025.01)

(52) U.S. Cl.
CPC ............. *A01N 1/122* (2025.01); *A01N 1/143* (2025.01)

(58) Field of Classification Search
CPC ................................. A01N 1/122; A01N 1/143
See application file for complete search history.

(56) References Cited

U.S. PATENT DOCUMENTS

| | | | |
|---|---|---|---|
| 7,824,848 | B2 | 11/2010 | Owen et al. |
| 8,349,551 | B2 | 1/2013 | Owen et al. |
| 9,301,519 | B2 | 4/2016 | Hassanein et al. |
| 9,986,734 | B2 | 6/2018 | Raredon et al. |
| 10,059,913 | B2 | 8/2018 | Ott |
| 2015/0289501 | A1 | 10/2015 | Raredon et al. |
| 2017/0015963 | A1 | 1/2017 | Ott |
| 2020/0329699 | A1 | 10/2020 | Freed |

FOREIGN PATENT DOCUMENTS

WO    WO-2015126853 A1 *    8/2015    ............. A01N 1/143

* cited by examiner

*Primary Examiner* — John Mcguirk
(74) *Attorney, Agent, or Firm* — Mark E. Tetreault

(57) ABSTRACT

A system and method for maintaining the vitality of an organ through negative pressure ventilation and perfusion. The system includes fluidically coupled components: an organ enclosure, a diaphragm enclosure, an actuator/pump, a perfusion system, and a reservoir. The actuator can displace a precise amount of a working fluid that displaces that precise amount of a sterile support fluid. The sterile fluid travels between the diaphragm enclosure and the organ enclosure, thereby ventilating the organ within the organ chamber. The perfusion system circulates a perfusate through the organ.

18 Claims, 12 Drawing Sheets

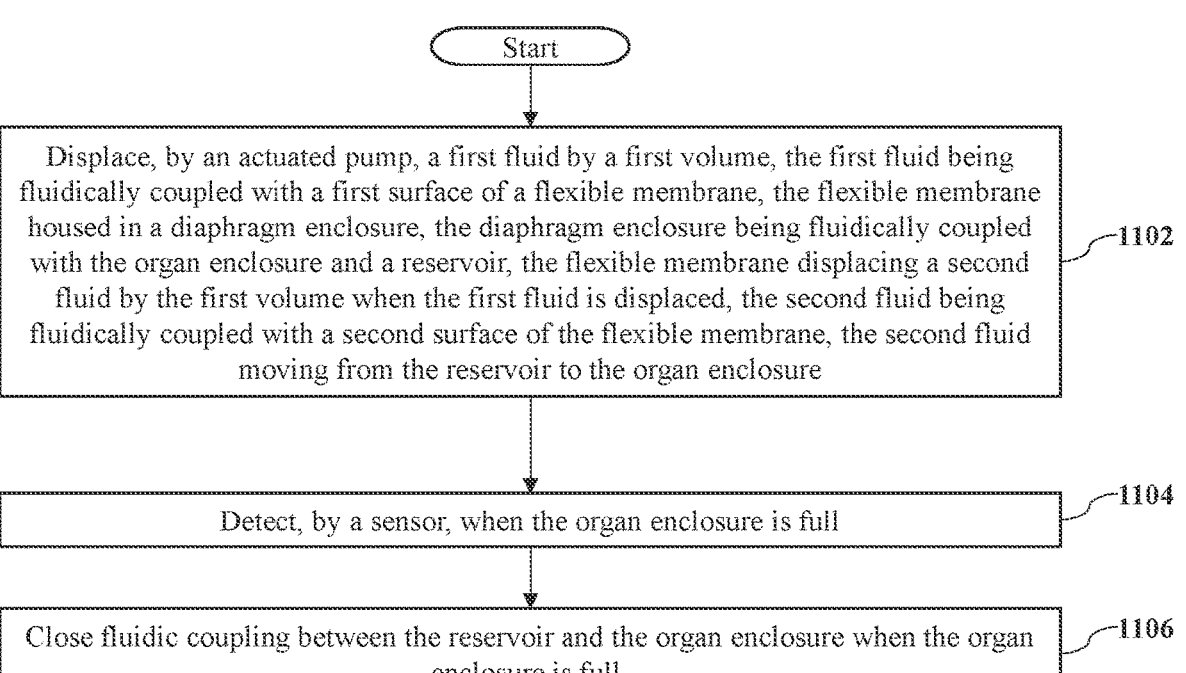

1100

Start

Displace, by an actuated pump, a first fluid by a first volume, the first fluid being fluidically coupled with a first surface of a flexible membrane, the flexible membrane housed in a diaphragm enclosure, the diaphragm enclosure being fluidically coupled with the organ enclosure and a reservoir, the flexible membrane displacing a second fluid by the first volume when the first fluid is displaced, the second fluid being fluidically coupled with a second surface of the flexible membrane, the second fluid moving from the reservoir to the organ enclosure — 1102

Detect, by a sensor, when the organ enclosure is full — 1104

Close fluidic coupling between the reservoir and the organ enclosure when the organ enclosure is full. — 1106

Start

Displace, by an actuated pump, a first fluid by a first volume, the first fluid being
fluidically coupled with a first surface of a flexible membrane, the flexible membrane
housed in a diaphragm enclosure, the diaphragm enclosure being fluidically coupled
with an organ enclosure, the flexible membrane displacing a second fluid by the first
volume when the first fluid is displaced, the second fluid being fluidically coupled
with a second surface of the flexible membrane, the second fluid moving into and out
of the organ enclosure causing the organ to expand and contract, forcing air into and
out of the organ.      ⌐1202

FIG. 12

SYSTEM AND METHOD FOR VENTILATING AN ORGAN

CROSS-REFERENCE TO RELATED APPLICATIONS

This application claims the benefit of U.S. Provisional Application Ser. No. 63/260,097, filed Aug. 9, 2021, entitled SYSTEM AND METHOD FOR VENTILATING AN ORGAN which is incorporated herein by reference in its entirety.

BACKGROUND

This disclosure relates generally to a system for controlling airflow into an organ. To provide airflow to an organ, positive pressure or negative pressure can be used to move the air. When positive pressure is applied, air is moved into the organ, forcing the organ to expand. When negative pressure is applied, the organ is expanded, drawing air into the organ. Negative pressure ventilation (NPV) has been used in vivo as assistive breathing for patients afflicted with, for example, polio. Certain actions on organs require the organs to be situated ex vivo and ventilated for more than a threshold amount of time. These actions include, but are not limited to, laboratory study of the organs and transport/maintenance/monitoring/repairing of organs for transplant. NPV can be performed by, for example, extracting air from a bioreactor holding the organ, forcing the organ to expand and draw in air, simulating inhalation. The process can be reversed, i.e. providing air to the bioreactor, forcing the organ to contract and release the air, simulating exhalation. This two-step process is used as an improvement over using only positive pressure, which can induce injury to the organ. Current NPV systems have limitations including, but not limited to, (1) reacting to changes in compressibility or other material properties of hydraulic fluids during operation (temperature dependency, deterioration/separation), (2) being subject to air bubbles inside either hydraulic fluid chamber, as a result from insufficient system priming, system leaks, or bubble generation during operation, (3) experiencing elasticity of the diaphragm membrane between the hydraulic fluids, along the thickness of the material, (4) experiencing elasticity of a scaffold/tissue (external volume expansion not equal to internal volume expansion), (5) experiencing elasticity/lack of rigidity in the hydraulic system (chambers, tubing), (6) experiencing leaks from improper seals around the hydraulic piston or system fittings, (7) experiencing backlash in the piston linear actuator, (8), experiencing airway restrictions or obstructions, (9) improper or inadequate locations of sensors in hydraulic pathways and airway, and (10) sub-optimal methods and assumptions used to determine parameters if direct measurements are not taken (tidal volume calculated from airway flowrates).

The above-described background is merely intended to provide a contextual overview of some current issues, and is not intended to be exhaustive.

SUMMARY

The system of the present teachings generates cyclic ventilation of an organ through a fluidically-coupled diaphragm. A NPV system controls airflow into and out of the organ. In as aspect, the system of the present teachings measures various pressures, tidal volume, and temperature parameters in order to track and assess organ performance.

In an aspect, materials and environments contacting the organ are sterile. The organ is submerged in a sterile support fluid, to provide moisture to the exterior of the organ. The sterile support fluid is coupled to a working hydraulic fluid by way of an elastic, impermeable diaphragm membrane. The working hydraulic fluid is actuated with a low-pressure piston in a pumping chamber. The perfusion loop supplying the organ with a blood perfusate solution is connected to the organ artery and vein. The system can include sensors to measure the parameters such as, but not limited to, support fluid temperature, perfusate temperature, pulmonary flow-rate, pulmonary or arterial pressure, inspiratory tidal volume, peak inspiration pressure, (also called peak airway pressure), inspiratory air temperature and humidity, and positive end-expiratory pressure. The system includes the capability to measure these parameters in order to plot the pressure-volume relationships and calculate the dynamic compliance of the organ tissue. All parts can be sterile single use, or there can be a combination of single use and autoclavable parts.

The organ bioreactor of the present teachings can include a reservoir chamber and an organ chamber containing sterile support fluid, a working fluid chamber containing working hydraulic fluid, also referred to herein as working fluid, and a diaphragm in a diaphragm chamber separating the sterile support fluid from the working fluid. The reservoir chamber can be used to prepare the system for operational use, for example, for priming the system. The organ bioreactor and actuator can be used to accomplish the ventilation operation. The diaphragm allows the sterile and working fluids to be coupled. For example, as the working fluid is drawn out of the diaphragm chamber by the actuator, the diaphragm deforms and sterile fluid is drawn into the diaphragm chamber to replace the working fluid. The system can include solenoid valves to isolate or connect portions of the fluid network during operation. The organ chamber can include a mounting plate that can secure and position the organ. The mounting plate is configured to include openings that can be used to introduce and expel air, and circulate perfusate. The mounting plate is configured to be removed to attach/detach the organ then secured to the organ chamber to seal the system before operation. A system such as is described in U.S. patent application Ser. No. 17/180,506 entitled System and Method for Organ Maintenance and Transport, filed on Feb. 19, 2021, can be used to enable the perfusate circulation.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for negative pressure ventilation of an organ. The system also includes an actuator configured to cause a first fluid to be displaced by a first volume. The system also includes a diaphragm enclosure housing a flexible membrane, the flexible membrane having two surfaces, one of the two surfaces fluidically coupled with the first fluid, an other of the two surfaces fluidically coupled with a second fluid, the flexible membrane displacing the second fluid by the first volume when the actuator causes the first fluid to be displaced. The system also includes an organ enclosure housing the organ, the organ enclosure being fluidically coupled with the diaphragm enclosure, the organ enclosure receiving the second fluid from the diaphragm enclosure when the actuator causes the first fluid to be displaced. The system also includes where displacement of the second fluid enables the negative pressure ventilation and inhalation/exhalation of air by the organ. Other embodiments of this aspect include corresponding computer systems, apparatus, and computer programs recorded on one or more computer storage devices, each configured to perform the actions of the methods.

Implementations may include one or more of the following features. The system as may include: at least one sensor configured to collect sensor data. The at least one sensor may include: a tidal volume sensor configured to collect tidal volume sensor data during the negative pressure ventilation, and a pressure sensor configured to sense pressure of the second fluid during the negative pressure ventilation. The at least one sensor may include: a bubble sensor configured to collect bubble sensor data during a priming process. The system as may include: at least one controller configured to execute instructions, the instructions configured to control devices in the system. The instructions may include: receiving the sensor data, and controlling the actuator based at least on the sensor data. The system as may include: a reservoir holding the second fluid, the reservoir being fluidically coupled with the diaphragm enclosure. The instructions may include: receiving bubble sensor data from a bubble sensor, the bubble sensor being fluidically coupled with the reservoir and the organ enclosure; and moving an amount of the second fluid from the reservoir to the organ enclosure, the amount being based on the bubble sensor data. The system as may include: a perfusion system including: at least one perfusion pump; and a gas management system including an enclosure configured to expose venous fluid to gas; a thermal management system including a device configured to expose the venous fluid exiting the gas management system to a thermal adjustment means; and a perfusate reservoir including a fluid enclosure configured to hold the venous fluid destined for the organ, the perfusate reservoir configured to receive perfusate to mix with the venous fluid forming a mixed fluid, the perfusate reservoir including a drain configured to discharge excess of the venous fluid and/or the mixed fluid. The instructions include controlling the perfusion pump, the gas management system, and the thermal management system, the instructions configured to instruct the perfusion pump to pump the venous fluid from the organ through the gas management system and the thermal management system and into the organ. The perfusion system may include: at least one venous fluid sample port. The perfusion system may include: at least one venous sensor. The perfusion system may include: at least one arterial fluid sample port. The perfusion system may include: at least one arterial sensor. The perfusate may include: a blood-based fluid. The perfusate may include: oxygen-carrying molecules. The system as may include: a portable enclosure enclosing the actuator, the flexible membrane, the organ enclosure, and the perfusion system; and a portable power supply. The instructions may include: maintaining dissolved gas concentration in the venous fluid at a pre-selected level. The instructions may include: maintaining dissolved gas concentration in the venous fluid at a user-entered level. The instructions may include: maintaining dissolved gas concentration in the venous fluid at a dynamically-determined level. The devices may include: a valve controlling flow to/from the reservoir and the organ enclosure, the at least one sensor, the actuator, a gas management system providing gas to the venous fluid, and a perfusion pump moving the venous fluid from a venous cavity in the organ to an arterial cavity in the organ. The instructions may include: maintaining dissolved gas concentration in the perfusate at a pre-selected level. The instructions may include: dynamically modifying ventilation and perfusion parameters based at least on data from the at least one sensor. The instructions may include: dynamically modifying characteristics of the perfusate, the venous fluid, and the second fluid based at least on data from the at least one sensor; and assessing a condition of the organ, the venous fluid, and the perfusate based at least on data from the at least one sensor. The instructions may include: computing measurements by measuring a pressure in the organ enclosure, a stroke of the actuator, and characteristics of the air; and controlling conditions of the negative pressure ventilation based on the measurements. The instructions may include: controlling perfusion of the mixed fluid and characteristics of the perfusate based at least on a flowrate of the perfusate and the mixed fluid, a pressure of the perfusate and the mixed fluid at an arterial cavity, temperature of the perfusate and the mixed fluid, and chemical composition of the perfusate and the mixed fluid. The instructions may include: assessing the perfusate and the mixed fluid, and automatically adjusting a characteristic of the perfusate and the mixed fluid based at least on the assessment. The instructions may include: assessing the perfusate and the mixed fluid; and automatically adjusting a characteristic of the perfusate and the mixed fluid based at least on the assessment, the adjusting based on a balance of gases provided to the gas management system, the balance being based at least on the assessment. The instructions may include: assessing compliance of the organ based at least on tidal volume and pressure of the organ. The instructions may include: assessing compliance of the organ based at least on oxygen flux. The instructions may include: adjusting a delivery pressure and a fill pressure independently to manage a flow rate of the perfusate and the mixed fluid to achieve a desired pressure of the perfusate and the mixed fluid. The instructions may include: adjusting a flow rate and a flow pressure of the perfusate and the mixed fluid as it enters the organ. The instructions may include: measuring a resistance in the organ, and adjusting a flow rate and a flow pressure of the perfusate and the mixed fluid as it enters the organ based on the resistance. The perfusate may include: a formulation designed to correct deficiencies in the organ. The perfusate may include: a formulation designed to maintain the organ at a pre-selected status for a pre-selected amount of time. The perfusate may include: a formulation designed to control an immune response in a recipient of the organ. The thermal management system may include: maintaining a temperature of the venous fluid and the mixed fluid in a pre-selected temperature range. The system as may include: a perfusate exchange system enabling replacement of the perfusate with a replacement solution. The system as may include: a filter between the at least one perfusion pump and the perfusate reservoir, the filter trapping particulates. The organ enclosure may include: four sides and a lid. The organ enclosure may include: a cylinder and a lid. The organ enclosure may include: transparent sides. The organ enclosure may include: a transparent lid. The organ enclosure may include: a platform for placing the organ. The organ enclosure may include: a platform for placing the organ, and a mounting plate operably coupled with the platform. The mounting plate may include: at least one tubing cavities configured to enable perfusion and ventilation of the organ. The organ enclosure may include: at least one interface enabling fluid exchange. The instructions may include: opening and closing valves enabling coupled filling and draining of the reservoir and the organ enclosure. The diaphragm enclosure may include: at least one exterior shell. The system as may include: a portable enclosure enclosing the actuator, the flexible membrane, and the organ enclosure; and a portable power supply. The second fluid may include: media formulated to support organ tissue. The second fluid may include: sterile fluid. The second fluid may include: isotonic fluid. The second fluid may include: water-based fluid. The second fluid may include: mineral-based hydraulic fluid. The system as may include: a valve controlling movement of the second fluid to/from the organ enclosure. The second fluid may include: proteins. The second fluid may include: clotting factors. Implementations of the described techniques may include hardware, a method or process, or computer software on a computer-accessible medium.

One general aspect includes a method for ventilating an organ using negative pressure ventilation. The method also includes displacing, by an actuated pump, a first fluid by a first volume, the first fluid being fluidically coupled with a first surface of a flexible membrane, the flexible membrane housed in a diaphragm enclosure, the diaphragm enclosure being fluidically coupled with an organ enclosure, the flexible membrane displacing a second fluid by the first volume when the first fluid is displaced, the second fluid being fluidically coupled with a second surface of the flexible membrane, the second fluid moving into and out of the organ enclosure causing the organ to expand and contract, forcing air into and out of the organ. Other embodiments of this aspect include corresponding computer systems, apparatus, and computer programs recorded on one or more computer storage devices, each configured to perform the actions of the methods.

Implementations may include one or more of the following features. The method as may include: sensing tidal volume of the air. The method as may include: pumping perfusate out of the organ, collecting data associated with the perfusate, adjusting characteristics of the perfusate based at least on the collected data forming adjusted perfusate, and pumping the adjusted perfusate into the organ. The method as may include: forming mixed fluid by mixing fresh perfusate with the adjusted perfusate based on the collected data. The method as may include: controlling perfusion of the mixed fluid and characteristics of the perfusate based at least on a flowrate of the perfusate and the mixed fluid, a pressure of the perfusate and the mixed fluid at an arterial cavity, temperature of the perfusate and the mixed fluid, and chemical composition of the perfusate and the mixed fluid. The method as may include: assessing the perfusate and the mixed fluid, and automatically adjusting a characteristic of the perfusate and the mixed fluid based at least on the assessment. The method as may include: assessing the perfusate and the mixed fluid; and automatically adjusting a characteristic of the perfusate and the mixed fluid based at least on the assessment, the adjusting based on a balance of gases provided to a gas management system, the balance being based at least on the assessment. The method as may include: adjusting a delivery pressure and a fill pressure independently to manage a flow rate of the perfusate and the mixed fluid to achieve a desired pressure of the perfusate and the mixed fluid. The method as may include: adjusting a flow rate and a flow pressure of the perfusate and the mixed fluid as it enters the organ. The method as may include: measuring a resistance in the organ, and adjusting a flow rate and a flow pressure of the perfusate and the mixed fluid as it enters the organ based on the resistance. The method as may include maintaining a temperature of a venous fluid and the mixed fluid in a pre-selected temperature range. The method as may include: draining the adjusted perfusate based on the collected data. The method as may include: filtering the air. The method as may include: perfusing the organ normothermically. The method as may include: perfusing the organ non-normothermically. The method as may include: assessing characteristics of the organ during negative pressure ventilation, and perfusing and/or ventilating medications into the organ based on the characteristics. The second fluid may include: media formulated to support organ tissue. The second fluid may include: sterile fluid. The second fluid may include: isotonic fluid. The second fluid may include: water-based fluid. The second fluid may include: mineral-based hydraulic fluid. The method as may include: controlling, by a valve, movement of the second fluid to/from the organ enclosure. The method as may include: maintaining dissolved gas concentration in a venous fluid at a pre-selected level. The method as may include: maintaining dissolved gas concentration in a venous fluid at a user-entered level. The method as may include: maintaining dissolved gas concentration in a venous fluid at a dynamically-determined level. The method as may include: controlling, by a valve, flow to/from a reservoir and the organ enclosure, the reservoir being fluidly coupled with the diaphragm enclosure; providing, by a gas management system, gas to a venous fluid; and moving, by a perfusion pump, the venous fluid from a venous cavity in the organ to an arterial cavity in the organ. The method as may include: maintaining dissolved gas concentration in a perfusate at a pre-selected level. The method as may include: dynamically modifying ventilation parameters and perfusion parameters based at least on data from at least one sensor. The method as may include: dynamically modifying characteristics of a perfusate, a venous fluid, and the second fluid based at least on data from the at least one sensor; and assessing a condition of the organ, the venous fluid, and the perfusate based at least on data from the at least one sensor. The perfusate may include: a formulation designed to correct deficiencies in the organ. The perfusate may include: a formulation designed to maintain the organ at a pre-selected status for a pre-selected amount of time. The perfusate may include: a formulation designed to control an immune response in a recipient of the organ. The method as may include: enabling, by a perfusate exchange system, replacement of the perfusate with a replacement solution. The method as may include: computing measurements by measuring a pressure in the organ enclosure, a stroke of an actuator, and characteristics of the air; and controlling conditions of the negative pressure ventilation based on the measurements. The method as may include: assessing compliance of the organ based at least on tidal volume and pressure of the organ. The method as may include: assessing compliance of the organ based at least on oxygen flux. The method as may include: trapping, by a filter, particulates between at least one perfusion pump and a perfusate reservoir. The organ enclosure may include: four sides and a lid. The organ enclosure may include: a cylinder and a lid. The organ enclosure may include: transparent sides. The organ enclosure may include: a transparent lid. The organ enclosure may include: a platform for placing the organ. The organ enclosure may include: a platform for placing the organ, and a mounting plate operably coupled with the platform. The mounting plate may include: at least one tubing cavities configured to enable perfusion and ventilation of the organ. The organ enclosure may include: at least one interface enabling fluid exchange. The method as may include: opening and closing valves enabling coupled filling and draining of a reservoir and the organ enclosure.

The diaphragm enclosure may include: at least one exterior shell. The second fluid may include: proteins. The second fluid may include: clotting factors. Implementations of the described techniques may include hardware, a method or process, or computer software on a computer-accessible medium.

One general aspect includes a method for priming an organ enclosure. The method also includes displacing, by an actuated pump, a first fluid by a first volume, the first fluid being fluidically coupled with a first surface of a flexible membrane, the flexible membrane housed in a diaphragm enclosure, the diaphragm enclosure being fluidically coupled with the organ enclosure and a reservoir, the flexible membrane displacing a second fluid by the first volume when the first fluid is displaced, the second fluid being fluidically coupled with a second surface of the flexible membrane, the second fluid moving from the reservoir to the organ enclosure. The method also includes detecting, by a sensor, when the organ enclosure is full. The method also includes closing fluidic coupling between the reservoir and the organ enclosure when the organ enclosure is full. Other embodiments of this aspect include corresponding computer systems, apparatus, and computer programs recorded on one or more computer storage devices, each configured to perform the actions of the methods.

BRIEF DESCRIPTION OF THE DRAWINGS

Non-limiting and non-exhaustive aspects of the subject disclosure are described with reference to the following figures, wherein like reference numerals refer to like parts throughout the various views unless otherwise specified.

FIG. 11 is a flowchart of a first exemplary method of the present teachings; and FIG. 12 is a flowchart of a second exemplary method of the present teachings.

DETAILED DESCRIPTION

The system of the present teachings applies negative pressure and perfusion to an organ to simulate the organ's function in the body. For example, if the organ is a lung, in an aspect, the system of the present teachings induces inspiration of air into the lung by withdrawing sterile support fluid from an organ chamber housing the lung. In an aspect, the system induces exhalation by adding sterile support fluid to the organ chamber. A controller issues commands to an actuator, and the actuator enables sterile support fluid movement to/from the organ chamber. A sterile boundary is maintained between the working fluid in the actuator and the sterile support fluid in the organ chamber by the inclusion of a flexible membrane, separating and coupling the fluids. The diaphragm chamber consists of two exterior shells and the flexible membrane. Fluid is able to flow into and out of each cavity through connection ports on each side of the diaphragm chamber. One port is connected to the actuator/syringe pump and the second port is connected to the organ chamber and reservoir. The interior of the diaphragm chamber is separated into two cavities by the elastic membrane, which also separates the system working and sterile fluids. The intent of this fluidic separation is to improve device sterility and disposability. By separating the working fluid within the actuator/syringe pump and the sterile support fluid in the organ chamber, the elastic membrane functions as a separation between the durable/non-disposable and disposable portions of the system. The elastic membrane provides a dynamic connection between the system working and sterile support fluid. As the actuator extends and working fluid is drawn into the syringe, the elastic membrane is pulled toward the syringe in response. Likewise, when the actuator retracts and working fluid is pushed out of the syringe, the membrane is pushed away from the syringe. The equal exchanges of these fluids allows the actuator/syringe pump to accurately displace sterile support fluid volumes into or out of the organ chamber.

Figure 1:
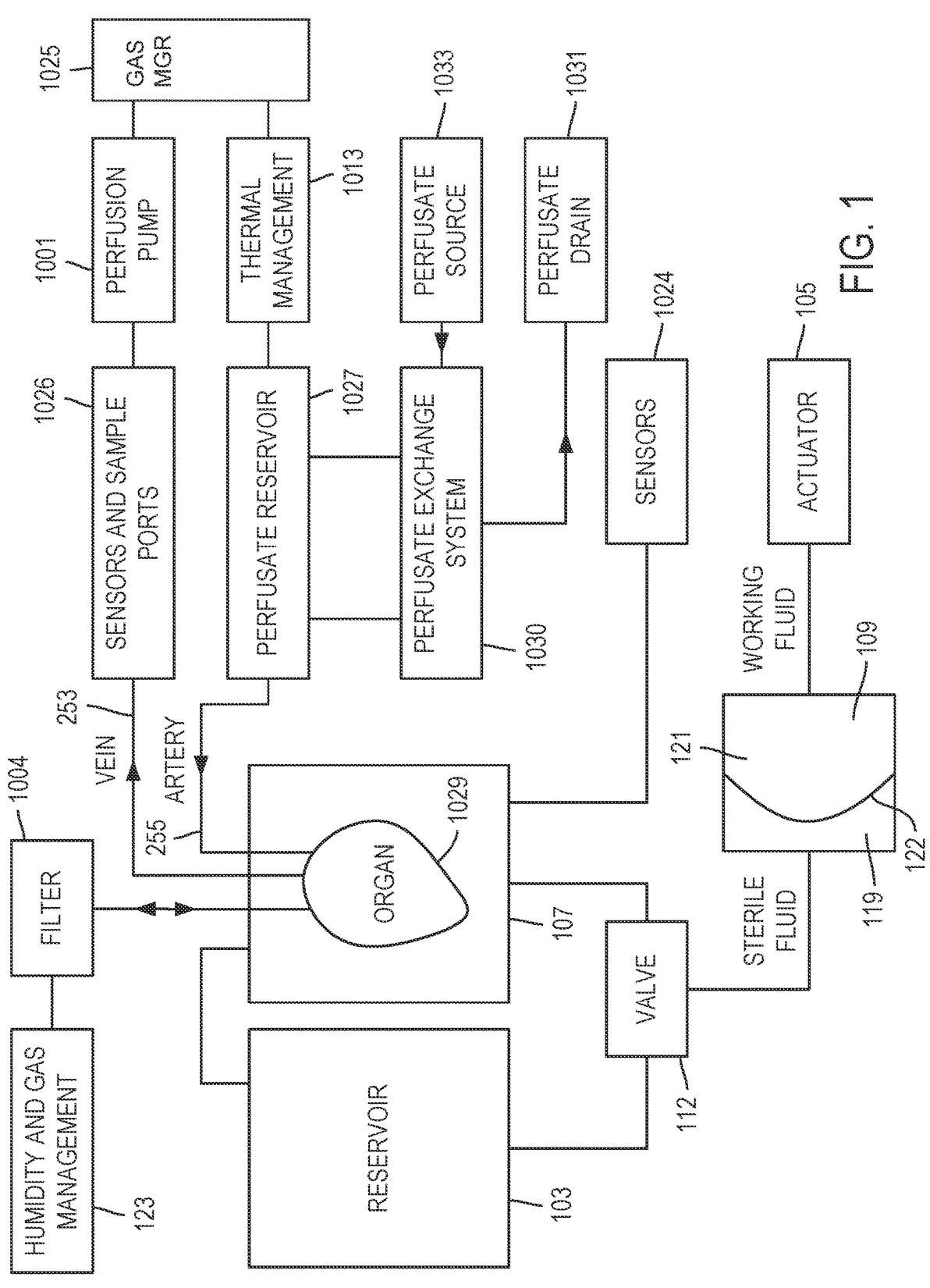
FIG. 1 is a schematic block diagram of the ventilation and perfusion systems of the present teachings.

Referring now to FIG. 1, in an aspect, fluids that drive the ventilation of the organ are stored in reservoir 103 and in actuator 105. The sterile support fluid can include any kind of media that is formulated to support organ tissue, for example, sterile and isotonic. The working fluid can include a water- or mineral-based hydraulic fluid, intended to sufficiently lubricate the actuator, reduce wear, and sustain high cycle counts during operation. The orientation of valve 112, open or closed, along with the position of diaphragm 122, enables the movement of the sterile support fluid to/from organ chamber 107. Perfusion of the organ enables normothermic or non-normothermic, possibly subnormothermic, maintenance of organ 1029. The perfusion system enables the circulation of perfusate drawn from perfusate reservoir 1027, to mimic in vivo flow through organ 1029, to the extent possible. To adequately mimic in vivo behavior, the venous fluid's dissolved gas concentrations and temperature are maintained at levels that can be pre-selected, manually entered, or dynamically determined, for example. The venous fluid circulates in a loop that carries the venous fluid from organ 1029 through a venous port, past sensors and sample ports 1026, through gas exchange mechanism 1025 and thermal management 1013, and into organ 1029 through an arterial port, possibly mixing with/exchanging with perfusate along the way forming a mixed fluid.

Continuing to refer to FIG. 1, in an aspect, system operation is enabled by a controller (not shown) processing data, a gas supply (not shown) receiving and supplying gases such as air, and pneumatic systems (not shown) moving fluid through the system. Sensors 1024 are positioned throughout the perfusion and ventilation loops, gathering sensed parameters. The exemplary configurations described herein do not limit the types or positions of sensors 1024 that can be added to the system of the present teachings. The controller processes these sensed parameters and metrics, and dynamically modifies ventilation and perfusion parameters, as well as perfusate and sterile support fluid properties, to assess the condition of the fluids as well the condition of the organ. For example, organ chamber pressure, actuator stroke/tidal volume, and organ air condition (pressure, humidity, temperature) can be measured and used to control the ventilation conditions during operation. Arterial pressure, perfusate flowrate, perfusate temperature, and perfusate chemical composition (lactate, glucose, oxygen saturation, dissolved oxygen, and pH) can be measured and used to control the perfusion system and perfusate properties. Sample ports enable the withdrawal of perfusate in the perfusion loop to assess the vitality of the organ. The assessment of perfusate drives manual and/or automatic changes in the many adjustments that can be made to ensure the vitality of the organ. For example, if the oxygen saturation falls below a pre-selected threshold, gas exchange mechanism 1025 adjusts the balance of gases and therefore correct the deficit in oxygen saturation. In an aspect, the perfusate can include a blood-based fluid. In an aspect, the perfusate can include an oxygen-carrying molecule. Assessing the health of the organ can be accomplished with the same sensor suite. For example, for a lung, dynamic compliance (based on tidal volume, the pressure of the lung at full inspiration and the pressure of the lung at full expiration) is an organ assessment metric. Oxygen flux is another organ assessment metric. Oxygen flux is based on removing oxygen and carbon dioxide, measuring oxygen and carbon dioxide before and after inspiration/expiration, and calculating the mass change of oxygen and carbon dioxide, and the flow rates.

Continuing to refer to FIG. 1, perfusion pump 1001 can include, for example, characteristics such as those set out in U.S. Pat. No. 8,273,049, issued on Sep. 25, 2012, entitled Pumping Cassette, incorporated herein in its entirety by reference. Perfusion pump 1001 fill pressure of the perfusate and delivery pressure of the mixed fluid (venous fluid and perfusate) are configured to be adjusted independently to manage the flow rate to achieve a desired pressure. Perfusion pump 1001 regulates flow rate and flow pressure of mixed fluid entering organ 1029. When resistance in organ 1029 changes, perfusion pump 1001 changes the pumping pressure and flow rate to accommodate the changed resistance. Perfusion pump 1001 enables low hemolysis when controlled by control and pneumatic systems (not shown) driven by pre-selected, default, user-specified, dynamically-determined or other criteria. In an aspect, the environment of the organ is configured to be adjusted so as to improve the condition of the organ. For example, if the organ arrives in a compromised condition, the perfusate can be formulated to correct deficiencies in the organ. Medications can be administered, and the health of the organ can be improved. In an aspect, perfusate can include growth media to both grow and challenge the organ. In an aspect, the system ensures that the organ is functional after perfusions/growth media are administered, possibly over a period of time. In an aspect, formulations of perfusate are targeted to time the scheduling of the transplant. Further, air that is being exchanged during ventilation can be amended to add medications, for example. When organs are to be used as transplants, the perfusate and air amendments can be formulated to reduce a potential adverse immune response by the recipient.

Continuing to refer to FIG. 1, gas exchange mechanism (gas management) 1025 adjusts gases in the perfusate when perfusion pump 1001 pumps the perfusate to gas management system 1025. Gas management system 1025 adjusts the gases that have been depleted or added as the perfusate travels through organ 1029. Thermal management 1013 maintains the perfusate temperature in a pre-selected temperature range by thermal management system 1013. Perfusate exiting organ 1029 through the vein can be directed to perfusion pump 1001, creating a closed loop circulation and possibly mitigating hemolysis. In an aspect, the exiting perfusate can be directed to perfusate reservoir 1027 or other component (not shown) to manage circulated perfusate. For some types of organs, flowing the output into perfusate reservoir 1027 can create an environment that can be as similar to the human body as possible. In some configurations, the output can be sent from perfusate exchange system 1030 to perfusate drain 1031, and a replacement solution from perfusate source 1033 can be infused into the system at a flow rate that matches the output flow rate. In some configurations, the exiting perfusate, the output, is measured to ensure the output quantity is exchanged by the replacement solution to ensure the output quantity is exchanged by the replacement solution. Perfusate reservoir 1027, thus, enables a complete circulation of the perfusate through organ 1029. In some configurations, a filter (not shown) is placed between perfusate reservoir 1027 and perfusion pump 1001. The filter traps particulates such as, for example, tissue mass or contamination, from being pumped into the organ. Organ chamber 107 can take any shape and size, depending upon the type of tissue being accommodated. For example, organ chamber 107 includes, for example, four sides and a lid, or a cylinder and a lid. In some configurations, the sides and lid can be transparent for viewing the enclosed tissue. In an aspect, filter 1004 anchors exit pressure from organ 1029. Organ 1029 rests in organ chamber 107, possibly upon a platform or coupled with a mounting plate. Organ chamber 107 includes characteristics that are generic to several organ types. Organ chamber 107 includes various interfaces to enable fluid input and output.

Continuing to refer to FIG. 1, in an aspect, the system of the present teachings can be portable, enabling movement of organs from one location to another, for example, from a harvest location to a transplant location. A portable power supply enables the actuator to continue moving the working fluid, thereby moving the sterile support fluid. The portable power supply powers the controller and perfusion pump, and any other device in need of power. In an aspect, the portable system including the actuator, the diaphragm, the organ enclosure, and a portable power supply is configured to be contained within an enclosure, the footprint of which can fit through a standard door. In an aspect, the portable system including the actuator, the diaphragm, the organ enclosure, the perfusion system, and a portable power supply is configured to be contained within an enclosure, the footprint of which can fit through a standard door.

Figure 2:
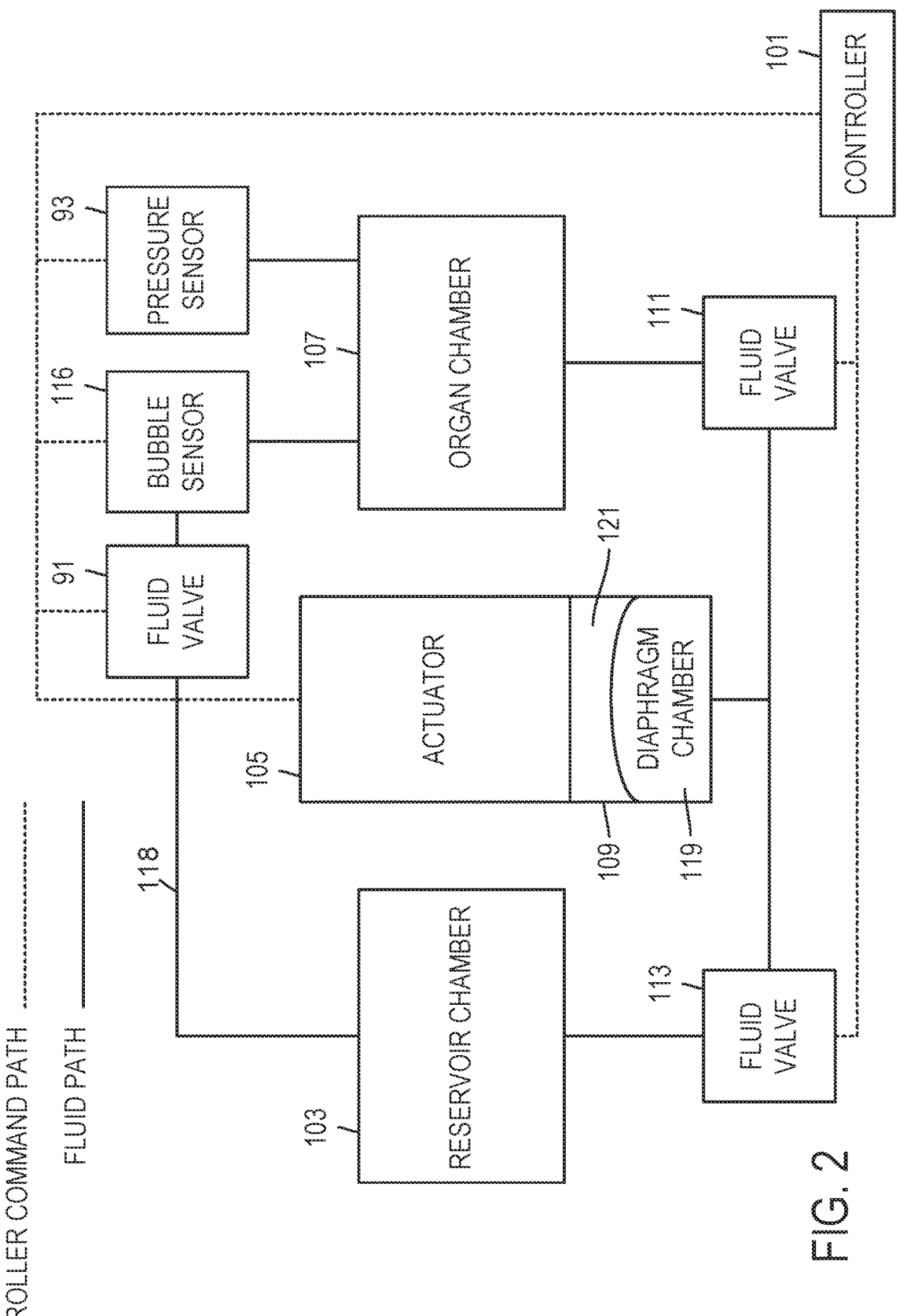
FIG. 2 is a schematic block diagram of the ventilation system of the present teachings.

Referring now to FIG. 2, in an aspect, the ventilation system of the present teachings includes controller 101. Controller 101 can drive both the ventilation and perfusion systems of the present teachings, but is described herein with respect to the ventilation system. Controller 101 is configured to send commands to open and close valves that can enable coupled filling and draining of reservoir 103 and organ chamber 107. Controller 101 is configured to command actuator 105 that enables fluid movement to and from actuator 105 at a pre-selected volume and rate.

Continuing to still further refer to FIG. 2, diaphragm chamber 109 includes at least one exterior shell and at least one membrane 122. Diaphragm chamber 109 is separated into two cavities by membrane 122, which also separates the working fluid from the sterile fluid. The intent of this fluidic separation is to improve device sterility and disposability. By separating the working fluid controlled by actuator 105 from the sterile fluid in organ chamber 107, diaphragm membrane 122 can function as a separation between the durable/non-disposable and disposable portions of the system. Diaphragm membrane 122 provides a dynamic connection between the system working and sterile fluids. As actuator 105 moves the syringe in one direction and the working fluid is drawn into the syringe, membrane 122 is pulled toward the syringe in response. Likewise, when actuator 105 moves the syringe in another direction and working fluid is pushed into actuator cavity 121, membrane 122 is pushed away from the syringe. The controlled exchange of these fluids allows actuator 105 to accurately displace sterile fluid volumes into or out of organ chamber 107. Fluid is able to flow into and out of sterile cavity 119 through connection ports/valves 113/111 on each side of membrane 122. Fluid valve 111 is fluidically connected to organ chamber 107 and fluid valve 113 is fluidically connected to reservoir 103. In one aspect, ports 111/113 can include individual 2-way valves. In one aspect, a single 3-way valve can be used to meter flow to both ports 111/113.

Continuing to refer to FIG. 2, in an aspect the ventilation system prepares the system of the present teachings for ventilating an organ by the use of a priming process. In an aspect, the priming process can include, but is not limited to including, draining organ chamber 107, filling reservoir 103 with sterile support fluid, and opening valve 113 connecting reservoir 103 with diaphragm chamber 109. When reservoir 103 is full, and organ chamber 107 is drained, the priming operation can begin. Controller 101 directs valve 113 to open and directs valve 111 to close, and directs actuator 105 to draw the working fluid into a syringe and out of actuator cavity 121. The syringe is configured to be mechanically coupled with actuator 105. Sterile support fluid from reservoir 103 fills chamber 119 formed by the movement of diaphragm 122 responding to the withdrawal of the working fluid from actuator cavity 121. Controller 101 directs valve 113 to close, valve 111 to open, and actuator 105 to force working fluid out of the syringe, pushing the working fluid in cavity 121, driving diaphragm 122 into fill chamber 119, and sterile support fluid into organ chamber 107. Controller 101 closes valve 111 and opens valve 113, to follow the process described until organ chamber 107 is full. In an aspect, to determine if organ chamber 107 is full of fluid, organ chamber 107 includes priming line 118 through which air and fluid pass. Priming line 118 is operably coupled with bubble sensor 116, for example, and is configured to be opened and closed by the operation of priming valve 91. When bubble sensor 116 no longer detects air or air bubbles, organ chamber 107 is configured to be filled. At this time, the priming process is complete. Controller 101 opens valve 113 and closes valves 111 and 91.

Continuing to still further refer to FIG. 2, following the priming operation, the organ can undergo general operations. General operations address modes of use, including, but not limited to, testing of an acellular scaffold, cell maturation in which cells might respond to a motion signal, cell maintenance with media, and organ/lung ventilation with vascular perfusion. The organ is submerged in the fluid in organ chamber 107. The organ is coupled with a mounting plate, and the mounting plate is attached to organ chamber 107 and sealed in place. Sealing can be accomplished by, for example, but not limited to, an o-ring. When the operation is complete, the organ is removed, and the organ chamber drained according to a reverse of the filling process described herein until a predetermined volume has been cycled. Pressure sensor 93 monitors the pressure of the sterile fluid that is exerted on the organ within organ chamber 107 during ventilation (peek inspiratory pressure and positive end-expiratory pressure). The pressure, along with the tidal volumes being measured/calculated by actuator 105, contribute to a pressure-volume relationship. The pressure-volume relationship can enable measurement of the dynamic compliance of the tissue material.

Continuing to refer to FIG. 2, the organ can leak in several ways, for example, but not limited to, blood's leaking out into the surrounding sterile support fluid, blood's leaking into air pathways in the organ, air leaking out into the surrounding sterile support fluid, and sterile support fluid leaking into air pathways into the organ. Methods of detection can include, but are not limited to including, monitoring the pressure profile of the inflation/deflation of the organ chamber and perfusion loop, detecting changes and characterizing them. In an aspect, methods of detection can include optical/ultrasonic sensors to indicate level height change and detect added gas or liquid, and optical sensors to monitor conductivity.

Referring now to FIGS. 3-6, various orientations of a configuration of the ventilation system are shown. Other configurations are possible. The ventilation system of the illustrated configuration includes four major parts: a reservoir, an organ chamber, a diaphragm chamber, and a working fluid actuator. The organ chamber holds the organ being ventilated, and possibly perfused. The reservoir holds sterile support fluid that is used to fill the organ chamber during a priming stage, and to enable ventilation during operational use. The working fluid actuator forces working fluid towards and away from a flexible diaphragm held by the diaphragm chamber. The parts of the ventilation system form a hydraulically actuated and mechanically coupled diaphragm pump that, when the working fluid is forced against the flexible diaphragm, moves sterile support fluid into the organ chamber to apply pressure and compression forces to the exterior of the organ. The compression forces on the organ serve to expel air from the organ. When the working fluid is withdrawn from the diaphragm, sterile support fluid is withdrawn from the organ chamber to fill the empty space in the diaphragm chamber. When sterile support fluid is withdrawn from the organ chamber, the organ experiences lower or negative pressure relative to the atmospheric/ambient conditions of the air supply, causing the organ to expand. The expansion draws air into the organ.

Continuing to refer to FIGS. 3-6, the priming process begins when reservoir 103 is filled with sterile support fluid. Reservoir 103 can be filled by any means, automatically upon startup of the system, controlled by controller 101 (FIG. 1), manually, or a combination of automatic and manual control. Fill/drain cavity 245 (FIG. 6) is configured to be fitted properly to enable filling or draining of reservoir 103. The composition of sterile support fluid can, for example, be sterile and isotonic. In an aspect, additives such as proteins and clotting factors can be included in the support fluid.

Figure 3:
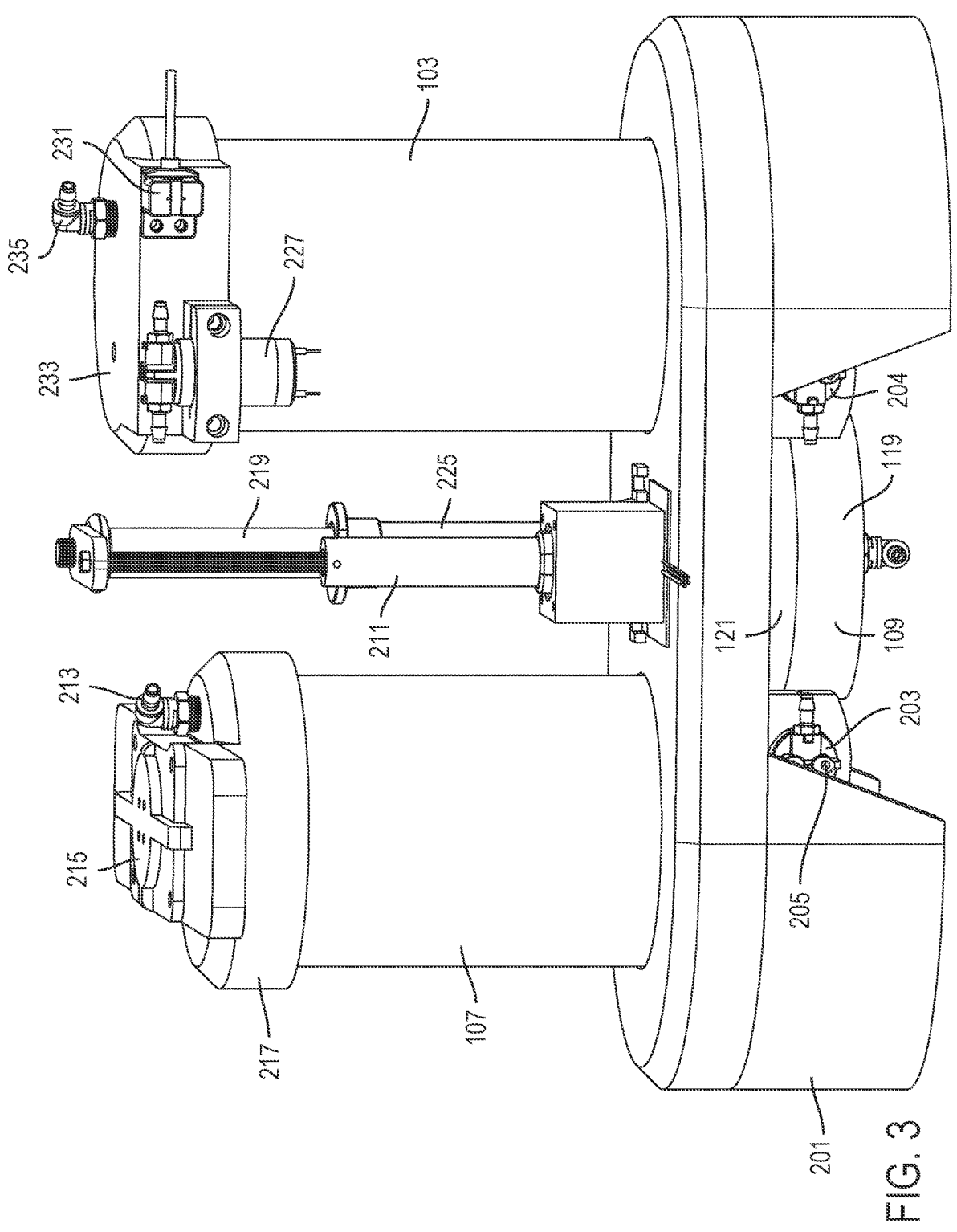
FIG. 3 is a schematic perspective diagram of a configuration of the ventilation system of the present teachings.
Figure 4:
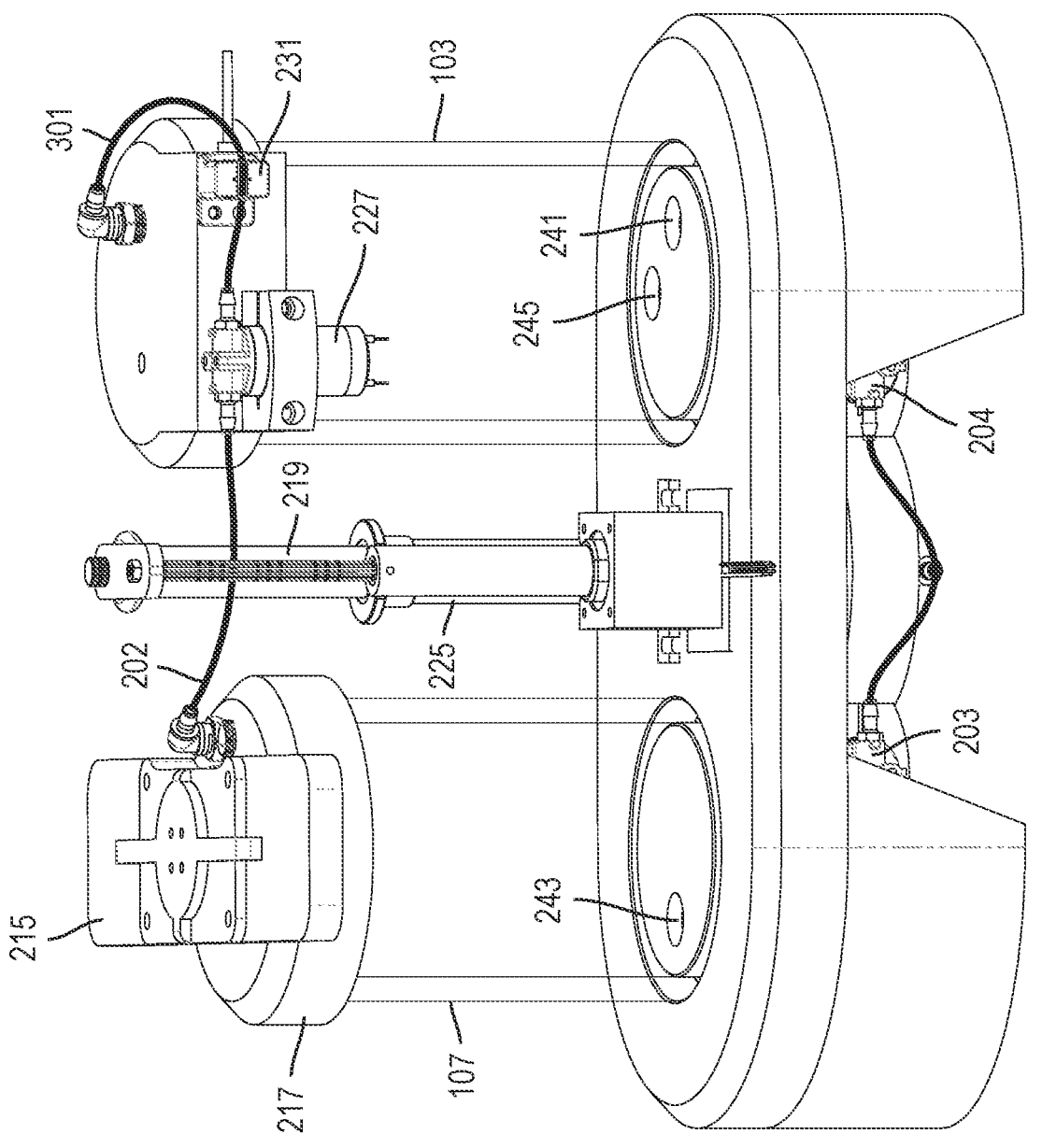
FIG. 4, is a pictorial diagram of the configuration of FIG. 3 including exemplary fluidic connections.
Figure 5:
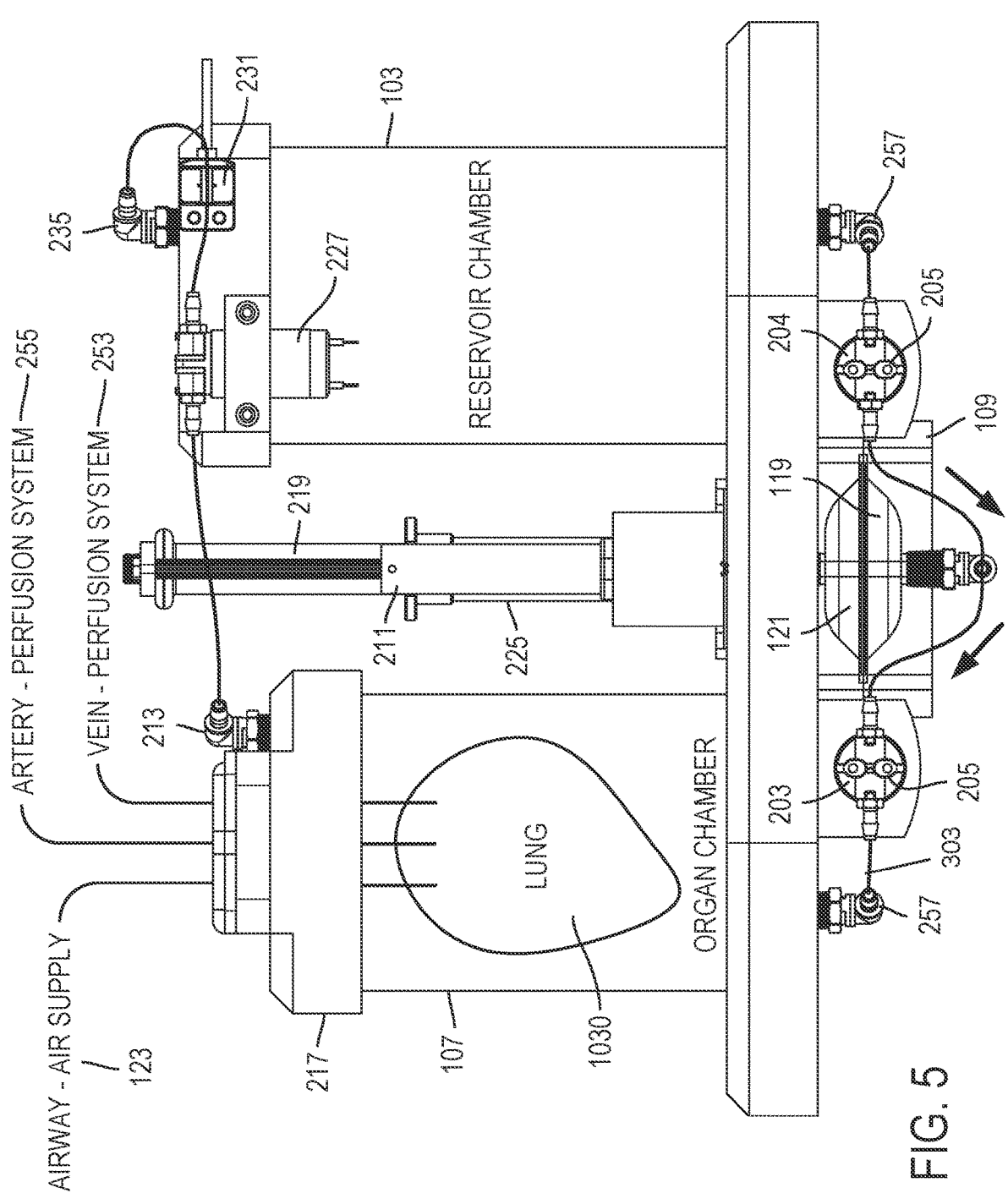
FIG. 5 is an elevation view of the chambers and actuator of the configuration of FIG. 3, including a mounted organ, and a section view of the diaphragm of the configuration of FIG. 3.
Figure 6:
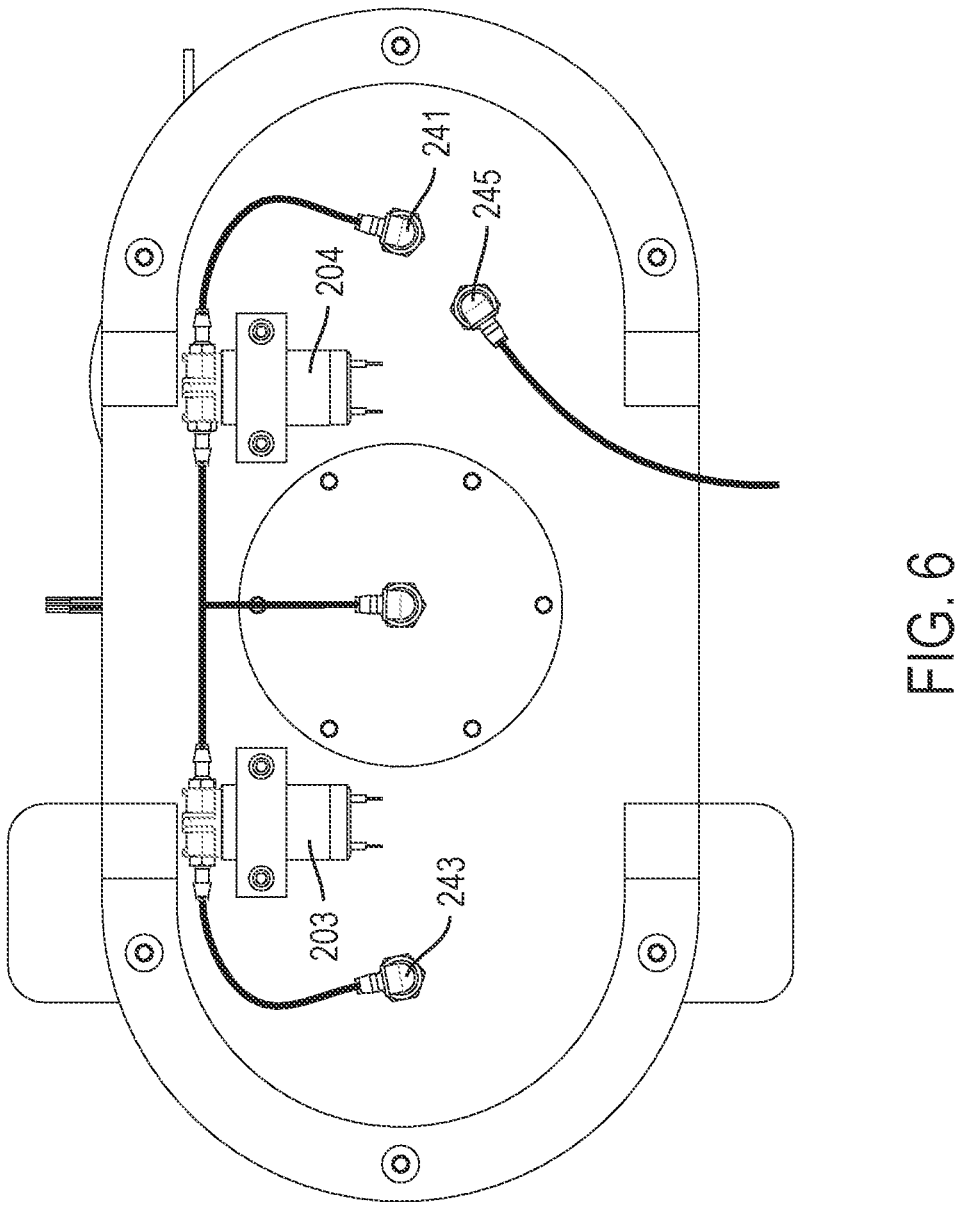
FIG. 6 is a schematic bottom perspective view of the configuration of FIG. 3.

Continuing to refer to FIGS. 3-6, in an aspect, reservoir 103 is covered by reservoir cap 233 that can be leak sealed (gas and liquid) by conventional means such as, for example, but not limited to, an o-ring or a gasket. Reservoir cap 233 can include sealed mounting cavities for, for example, but not limited to, tube fittings and sensors. In an aspect, reservoir cap 233 can include mountings, tube fittings, and sensors to enable determining whether the sterile support fluid has been entirely pumped into organ chamber 107 from reservoir 103 during the priming operation. In an aspect, the organ chamber fill operation terminates when organ chamber 107 contains no more gas. Whether or not organ chamber 107 contains gas can be determined, for example, by subjecting vented outflow from organ chamber 107 to a bubble sensor. In an aspect, bubble sensor 231 examines the outflow from the priming line arriving in tube 301 (FIG. 4). The priming line outflow is configured to enter reservoir 103 through barbed tube fitting 235. When bubble sensor 231 detects no air or air bubbles in tube 301 (FIG. 4), a valve such as a solenoid valve is configured to be closed, and outflow exiting from barbed tube fitting 213, passing through tube 202 (FIG. 4) from organ chamber 107 is discontinued. Other methods of determining that the priming operation has completed are contemplated by the present teachings.

Continuing to refer to FIGS. 3-6, organ chamber 107 is used to hold the organ that is undergoing ventilation and possibly perfusion. To maintain a sterile environment, organ chamber 107 can be covered by, and leak-sealed with, for example, chamber cap 217. In an aspect, chamber cap 217 is permanently affixed to organ chamber 107. The organ itself is held in place by mounting plate 215. Mounting plate 215 can be leak-sealed with, and removable from, chamber cap 217. In an aspect, mounting plate 215 can be integral with chamber cap 217, and the combination can be disengaged from organ chamber 107 to mount and remove an organ. Mounting plate 215 includes means for the organ to be perfused, and for gas in/outflow from the organ. In an aspect, mounting plate 215 can include tubing cavities for perfusion and ventilation. In an aspect, the tubing cavities can include a cavity for venous flow, a cavity for arterial flow, and at least one cavity for gas flow. In a configuration, arterial tube 255 (FIG. 5) enables arterial flow from a perfusion system, and venous tube 253 (FIG. 5) enables venous flow to the perfusion system. The perfusion system described herein with respect to FIG. 1 can be used. Other configurations of perfusion systems are contemplated by the present teachings. In a configuration, gas tube 123 (FIG. 5) provides a pathway for the organ to expel gas and to inhale gas, as described herein. The expelled and inhaled gas are monitored as described herein with respect to FIG. 1. Venous tube 253 (FIG. 5), arterial tube 255 (FIG. 5), and gas tube 123 (FIG. 5) can pass through mounting plate 215 and chamber cap 217 (if they are separate components), and can be cannulated to the organ at anatomically appropriate points.

Continuing to refer to FIGS. 3-6, in the shown exemplary configuration priming and ventilation are enabled by a combination of actuator 211, syringe 225, plunger 219, diaphragm membrane 122, reservoir valve 204, organ chamber valve 203, and tubing 303. The priming operation involves steadily moving the sterile support fluid from reservoir 103 to organ chamber 107. The process begins with reservoir 103 being full of sterile support fluid and organ chamber being empty of sterile support fluid. The organ can be mounted within organ chamber 107 before the priming operation takes place. As described herein, the first steps in the priming process include opening reservoir valve 204 and priming line valve 227, and closing organ chamber valve 203. In an aspect, reservoir valve 204 and organ chamber valve 203 can each be held in place by valve mounts 205. The second step in the priming process happens when a pumping configuration operates on the working fluid. In an aspect, the pumping configuration can include a precision syringe, coupled to a linear actuator motor. In an aspect, the linear actuator is connected to the plunger of the syringe and therefore controls the position and motion of the plunger. The shown configuration includes linear actuator 211, syringe plunger 219, and syringe barrel 225 that, together, draw working fluid out of diaphragm working fluid section 121.

Continuing to refer to FIGS. 3-6, the working fluid draws diaphragm 122 with it towards syringe barrel 225, thereby drawing sterile support fluid through barbed tube fitting 257 into tube 303, flowing into diaphragm sterile support fluid section 119. The third step in the priming process includes closing reservoir valve 204 and opening organ chamber valve 203. At this point, the sterile support fluid is occupying diaphragm sterile support fluid section 119, and the working fluid is occupying syringe 225. When organ chamber valve 203 is opened, the fourth step, in which actuator 211 commands plunger 219 to expel the working fluid in syringe 225 into diaphragm working fluid section 121, is executed. The working fluid pushes membrane 122 away from actuator 211, and therefore forces the sterile support fluid through valve 203, tubing 303, and a barbed fitting, into organ chamber 107. Steps 1-4 are repeated until bubble sensor 231 detects no further air or air bubbles in priming tube 301. At this point, the fifth step includes closing bubble chamber valve 227 and organ chamber valve 203.

Continuing to refer to FIGS. 3-6, ventilation begins when organ chamber 107 is filled with sterile support fluid surrounding the organ. Negative pressure ventilation involves an absence of forcing gas into the organ. Instead, the organ's geometry is modified by the changes in volume of the surrounding sterile support fluid, causing the organ to expand and contract. During the contraction phase, when the sterile support fluid volume is displaced into organ chamber 107, the relatively high pressure on the organ will cause it to contract, expelling gas from gas tube 123. During the expansion phase, when the sterile support fluid volume is displaced into diaphragm chamber 119, the relatively low pressure on the organ will cause the organ to expand, drawing gas into gas tube 123. The first step in the ventilation process is to open organ chamber valve 203, insuring that reservoir valve 204 and bubble chamber valve 227 are closed. The second step in the ventilation process is to enable actuator 211 to command syringe pump 219 to draw working fluid into syringe 225. As described with respect to the priming process, drawing the working fluid into syringe 225 causes membrane 122 to move towards actuator 211. The space in diaphragm chamber 109 formed by the movement of membrane 122 is filled by the sterile support fluid in organ chamber 107. The pressure on the organ from the sterile support fluid is reduced, and the organ expands, causing the organ to "inhale". The third step in the ventilation process is to enable actuator 211 to command syringe pump 219 to force the working fluid out of syringe 225 and into diaphragm chamber 109. The working fluid moves membrane 122 away from actuator 211, causing the sterile support fluid in diaphragm chamber section 119 to move into organ chamber 107. The additional sterile support fluid in organ chamber 107 forces the organ to contract and "exhale" whatever gas had inhaled during the previous step. Steps two and three can be repeated as long as is necessary to ventilate the organ. Gas expelled from the organ can be examined, and changes can be made in the timing of the ventilation steps, if necessary. For example, the time between when the working fluid is moved towards actuator 211 and the working fluid is moved away from actuator 211 can be adjusted if the organ shows signs of a depressed tidal volume, for example.

Figure 7:
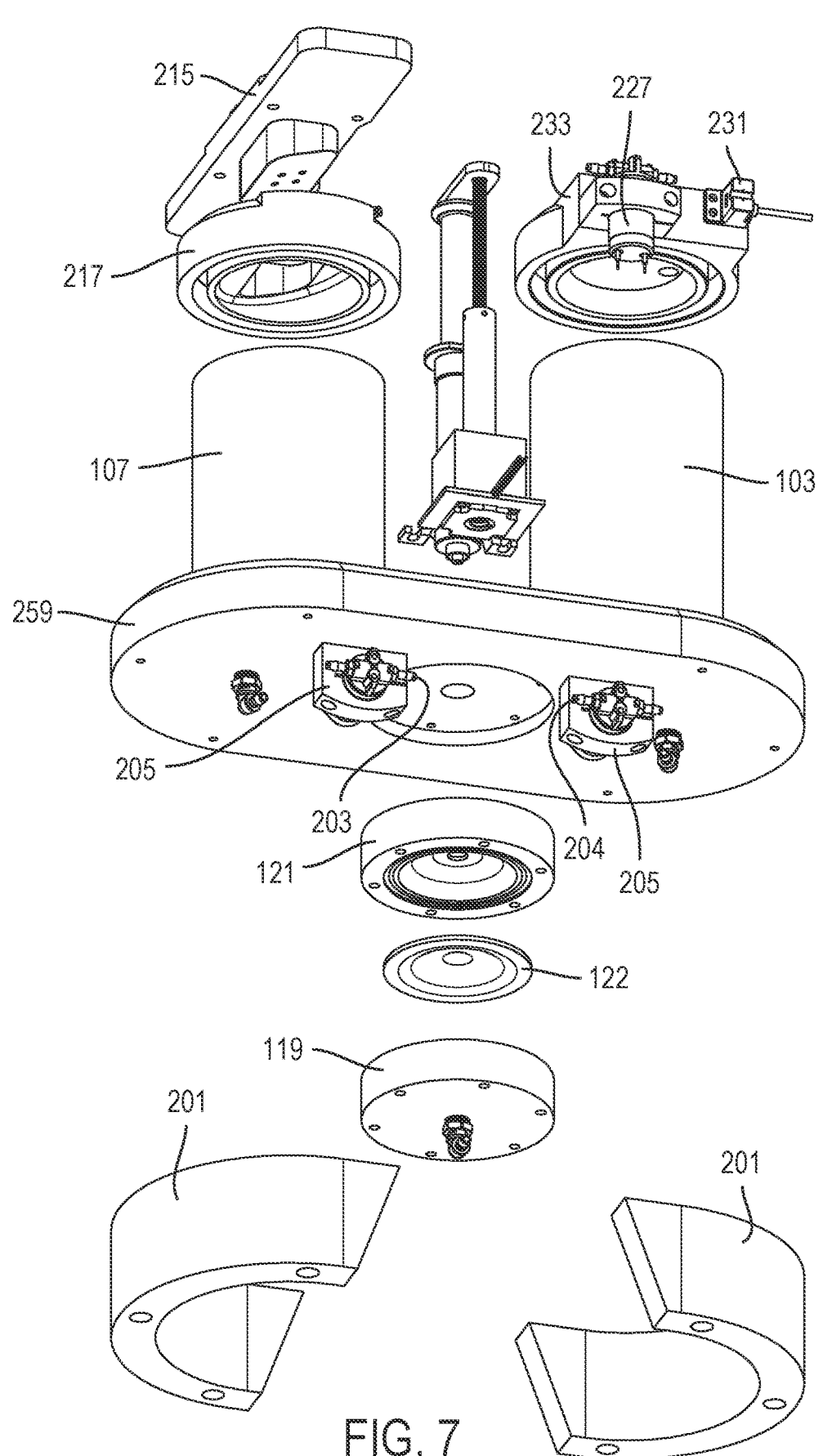
FIG. 7 is a schematic bottom exploded view of the configuration of FIG. 3.
Figure 8:
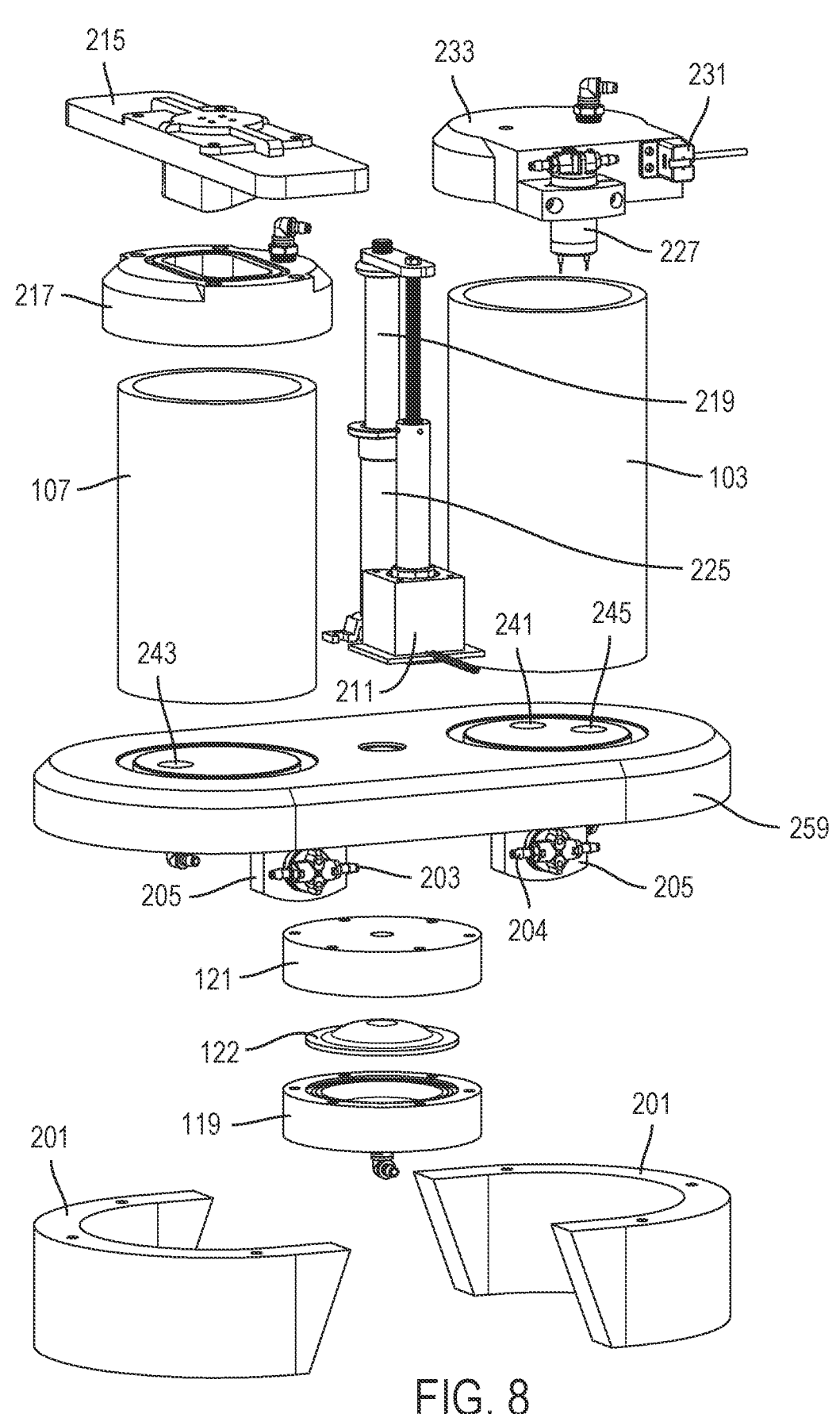
FIG. 8 is a schematic top exploded view of the configuration of FIG. 3.

Referring now to FIGS. 7 and 8, exploded, perspective views of the ventilator configuration of the present teachings are shown. Base 259 anchors the ventilation system, providing mounting locations for reservoir walls 103A and organ chamber walls 107A, as well as syringe 225, diaphragm chamber 109, and base stand 201. In an aspect, base stand 201 includes multiple sections that provide a stable ground rest and space for diaphragm chamber 109 between the sections. Base stand 201 includes a single component with cavities where necessary to provide space for diaphragm chamber 109. Reservoir walls 103A includes an enclosure that can be leak-seal mounted upon base 259. Base 259 includes a form-fitted pocket shaped according to the shape of reservoir walls 103A. Sealing materials are configured to, for example, be fitted (e.g. an o-ring) or released (e.g. adhesive) into the pocket. Reservoir casing 103A and the pocket can take any shape, for example, cylindrical or cubical. Base 259 includes mounting cavities 241/245 for apertures enabling fluid flow to and from reservoir 103 (FIG. 3). As described herein, during the priming process, sterile support fluid exits reservoir 103 (FIG. 3) at a pre-determined rate though a barbed tube fitting mounted in cavity 241. Cavity 245 houses a fitting as well, and provides a fill/drain for the sterile support fluid in reservoir 103 (FIG. 3). Organ chamber casing 107A can fit into the pocket in base 259 as described for reservoir casing 103A, for example. Reservoir casing 103A and organ chamber casing 107A can be shaped the same or differently. For example, one casing can be cylindrical while the other is cubical. Base 259 includes at least one cavity 243 that can accommodate a tube fitting. The tube fitting enables tubing to deliver and remove sterile support fluid from organ chamber 107, as described herein.

Figure 9:
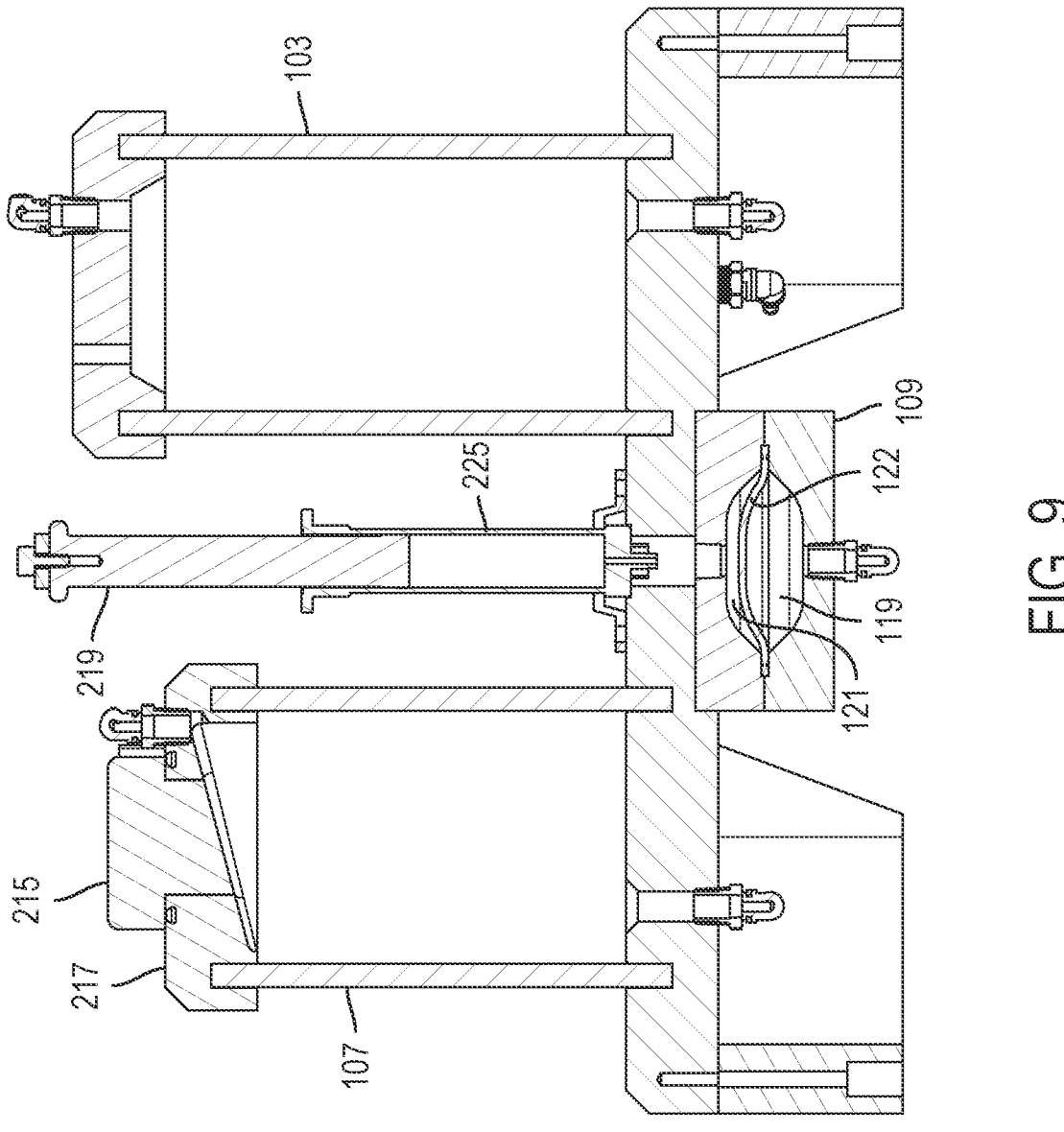
FIG. 9 is a cross section view of the configuration of FIG. 3.
Figure 10:
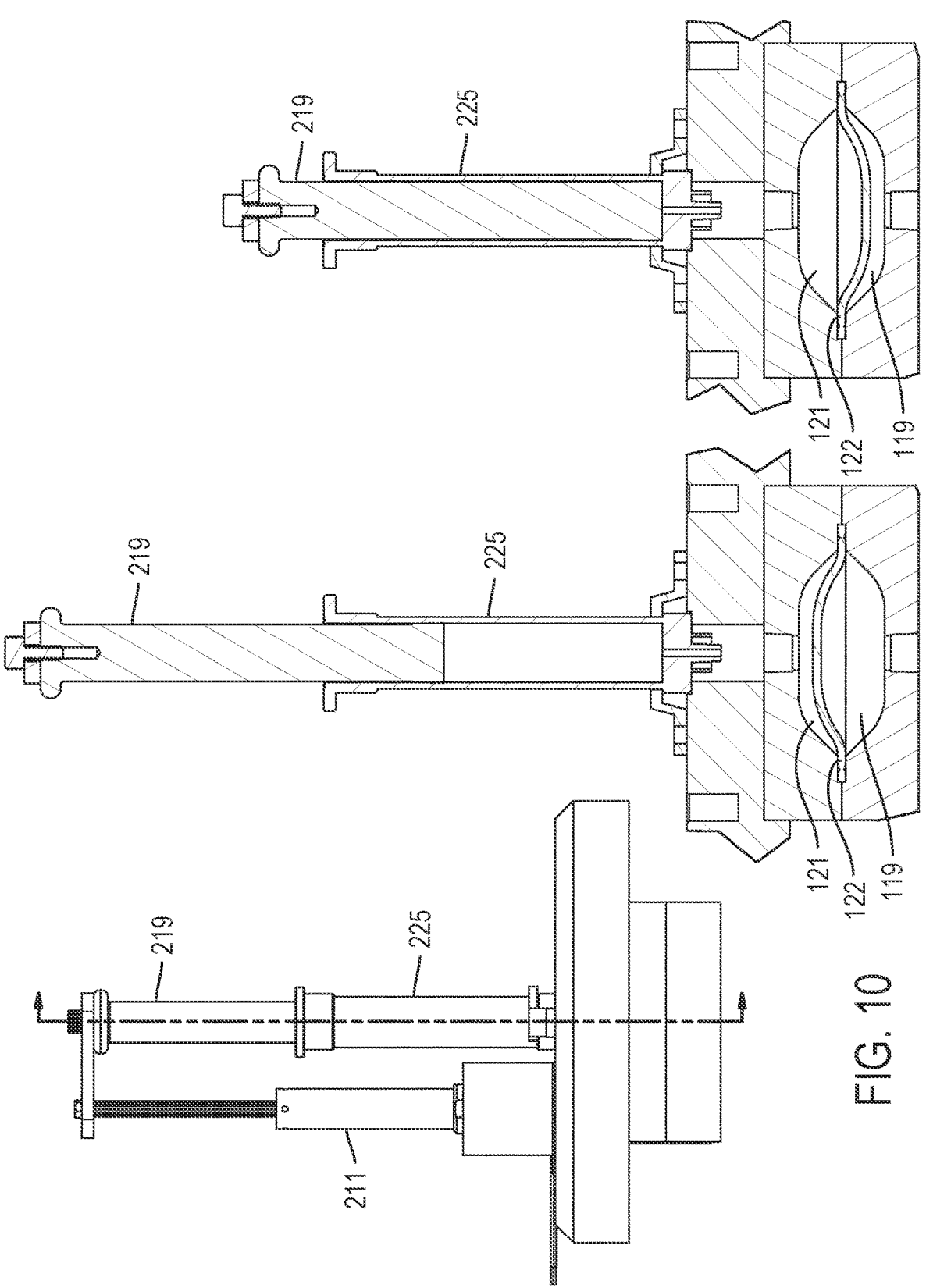
FIG. 10 is cross section view of the diaphragm of the configuration of FIG. 3 in two positions.

Referring now to FIGS. 9 and 10, cross section views of the exemplary configuration illustrate positions of diaphragm 122 when (1) syringe 219 has pulled the working fluid into barrel 225, and (2) syringe 219 has pushed the working fluid into working fluid diaphragm chamber 121. With respect to (1), when the working fluid is in barrel 225, sterile support fluid is drawn out of organ chamber 107 and into sterile support fluid diaphragm chamber 119. When the sterile support fluid is drawn out of organ chamber 107, the organ has room to expand, and when it expands, air is drawn in to fill the vacuum caused by the expansion. With respect to (2), when the working fluid is in working fluid diaphragm chamber 121, the sterile support fluid in sterile support fluid diaphragm chamber 119 moves into organ chamber 107 causing the organ to contract. The contraction expels air from the organ. The amount of sterile support fluid that moves into and out of the organ chamber 107 can be expressly controlled, thereby controlling the amount of ventilation experienced by the organ.

Referring now to FIG. 11, method 1100 for priming an organ enclosure can include, but is not limited to including, displacing 1102, by an actuated pump, a first fluid by a first volume, the first fluid being fluidically coupled with a first surface of a flexible membrane, the flexible membrane housed in a diaphragm enclosure, the diaphragm enclosure being fluidically coupled with the organ enclosure and a reservoir, the flexible membrane displacing a second fluid by the first volume when the first fluid is displaced, the second fluid being fluidically coupled with a second surface of the flexible membrane, the second fluid moving from the reservoir to the organ enclosure. Method 1100 includes detecting 1104, by a sensor, when the organ enclosure is full, and closing 1106 fluidic coupling between the reservoir and the organ enclosure when the organ enclosure is full. After the organ enclosure is primed, a method for ventilating an organ using negative pressure can include, but is not limited to including, displacing, by an actuated pump, a first fluid by a first volume, the first fluid being fluidically coupled with a first surface of a flexible membrane, the flexible membrane housed in a diaphragm enclosure, the diaphragm enclosure being fluidically coupled with an organ enclosure, the flexible membrane displacing a second fluid by the first volume when the first fluid is displaced, the second fluid being fluidically coupled with a second surface of the flexible membrane, the second fluid moving into and out of the organ enclosure causing the organ to expand and contract, forcing air into and out of the organ. In an aspect, the method includes sensing tidal volume of the air. In another aspect, the method includes pumping perfusate out of the organ, collecting data associated with the perfusate, adjusting characteristics of the perfusate based at least on the collected data forming adjusted perfusate, and pumping the adjusted perfusate into the organ. In another aspect, the method includes mixing fresh perfusate with the adjusted perfusate based on the collected data. In another aspect, the method includes draining the adjusted perfusate based on the collected data. In another aspect, the method includes filtering the air. In another aspect, the method includes perfusing the organ normothermically. In another aspect, the method includes perfusing the organ sub-normothermically. In another aspect, the method includes assessing characteristics if the organ during negative pressure ventilation, and perfusing and/or ventilating medications into the organ based on the characteristics.

Referring now to FIG. 12, method 1200 for ventilating an organ using negative pressure ventilation can include, but is not limited to including, displacing 1202, by an actuated pump, a first fluid by a first volume, the first fluid being fluidically coupled with a first surface of a flexible membrane, the flexible membrane housed in a diaphragm enclosure, the diaphragm enclosure being fluidically coupled with an organ enclosure, the flexible membrane displacing a second fluid by the first volume when the first fluid is displaced, the second fluid being fluidically coupled with a second surface of the flexible membrane, the second fluid moving into and out of the organ enclosure causing the organ to expand and contract, forcing air into and out of the organ.

Those of skill would understand that the methods described in the subject disclosure may be applied to computer systems configured to accomplish such methods, and/or to computer-readable media containing programs to accomplish such methods, and/or to software and/or firmware and/or hardware (e.g., integrated circuits) designed to accomplish such methods. Raw data and/or results may be stored for future retrieval and processing, printed, displayed, transferred to another computer, and/or transferred elsewhere. Communication links may be wired or wireless including by way of non-limiting example Ethernet, cellular or broadband networks, WiFi or local area networks, military communications systems, and/or satellite communications systems. Parts of a system may, for example, operate on a computer having a variable number of CPUs. Other alternative computer platforms can be used.

As one skilled in the art would understand, the methods described in the subject disclosure may be, in whole or in part, implemented electronically. Signals representing actions taken by elements of the system of the subject disclosure, and other disclosed configurations, may travel over at least one live communications network. Control and data information may be electronically executed and stored on at least one computer-readable medium. The system may be implemented to execute on at least one computer node in at least one live communications network. Common forms of computer-readable media can include, for example, but not be limited to, a floppy disk, a flexible disk, a hard disk, magnetic tape or any other magnetic medium, a compact disk read only memory or any other optical medium, punched cards, paper tape, or any other physical medium with patterns of holes, a random access memory, a programmable read only memory, an erasable programmable read only memory (EPROM), a Flash EPROM or any other memory chip or cartridge, or any other medium from which a computer can read.

Those of skill in the art would understand that information and signals may be represented using any of a variety of different existing techniques. For example, data, instructions, commands, information, signals, bits, symbols, or chips that may be referenced throughout the description may be represented by voltages, currents, electromagnetic waves, magnetic fields or particles, optical fields or particles, ultrasonic waves, projected capacitance, or any combination thereof.

Those of skill would further appreciate that the various illustrative logical blocks, modules, circuits, and algorithm steps described in connection with the arrangements disclosed herein may be implemented as electronic hardware, computer software, or combinations of both. To clearly illustrate this interchangeability of hardware and software, various illustrative components, blocks, modules, circuits, and steps have been described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the appended claims.

The various illustrative logical blocks, modules, and circuits described in connection with the arrangements disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The actions of a method or algorithm described in connection with the arrangements disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in functional equipment such as, e.g., a computer, a robot, a user terminal, a mobile telephone or tablet, a car, or an IP camera. In the alternative, the processor and the storage medium may reside as discrete components in such functional equipment.

The above description is not intended to be exhaustive or to limit the features to the precise forms disclosed. Various alternatives and modifications can be devised by those skilled in the art without departing from the disclosure, and the generic principles defined herein may be applied to other aspects without departing from the spirit or scope of the appended claims. Accordingly, the present disclosure is intended to embrace all such alternatives, modifications and variances. Additionally, while several arrangements of the present disclosure have been shown in the drawings and/or discussed herein, it is not intended that the disclosure be limited thereto, as it is intended that the disclosure be as broad in scope as the art will allow and that the specification be read likewise. Therefore, the above description should not be construed as limiting, but merely as examples of particular configurations. And those skilled in the art will envision other modifications within the scope and spirit of the claims appended hereto. Other elements, steps, actions, methods, and techniques that are not substantially different from those described above and/or in the appended claims are also intended to be within the scope of the disclosure. Thus, the appended claims are not intended to be limited to the arrangements shown and described herein, but are to be accorded the broadest scope consistent with the principles and novel features disclosed herein.

The arrangements shown in drawings are presented only to demonstrate certain examples of the disclosure. And, the drawings described are merely illustrative and are non-limiting. In the drawings, for illustrative purposes, the size of some of the elements may be exaggerated and not drawn to a particular scale. Additionally, elements shown within the drawings that have the same numbers may be identical elements or may be similar elements, depending on the context.

Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B. Furthermore, to the extent that the terms "includes," "has," "possesses," and the like are used in the present description and claims, such terms are intended to be inclusive in a manner similar to the term "comprising," as "comprising" is interpreted when employed as a transitional word in a claim.

Furthermore, the terms "first", "second", "third" and the like, whether used in the description or in the claims, are provided to distinguish between similar elements and not necessarily to describe a sequential or chronological order. It is to be understood that the terms so used are interchangeable under appropriate circumstances (unless clearly disclosed otherwise) and that the embodiments of the disclosure described herein are capable of operation in other sequences and/or arrangements than are described or illustrated herein.

What is claimed is:

1. A system for negative pressure ventilation of an organ comprising:

an actuator configured to cause a first fluid to be displaced by a first volume;

a diaphragm enclosure housing a flexible membrane, the flexible membrane having two surfaces, one of the two surfaces fluidically coupled with the first fluid, another of the two surfaces fluidically coupled with a second fluid, the flexible membrane displacing the second fluid by the first volume when the actuator causes the first fluid to be displaced; and an organ enclosure housing the organ, the organ enclosure being fluidically coupled with the diaphragm enclosure, the organ enclosure receiving the second fluid from the diaphragm enclosure when the actuator causes the first fluid to be displaced, wherein displacement of the second fluid enables the negative pressure ventilation of the organ.

2. The system as in claim 1 further comprising:

at least one sensor configured to collect sensor data.

3. The system as in claim 2 wherein the at least one sensor comprises:

a tidal volume sensor configured to collect tidal volume sensor data during the negative pressure ventilation; and a pressure sensor configured to sense pressure of the second fluid during the negative pressure ventilation.

4. The system as in claim 2 wherein the at least one sensor comprises:

a bubble sensor configured to collect bubble sensor data during a priming process.

5. The system as in claim 2 further comprising:

at least one controller configured to execute instructions, the instructions configured to control the actuator.

6. The system as in claim 5 wherein the instructions comprise:

receiving the sensor data; and controlling the actuator based at least on the sensor data.

7. The system as in claim 5 further comprising:

a reservoir holding the second fluid, the reservoir being fluidically coupled with the diaphragm enclosure.

8. The system as in claim 7 wherein the instructions comprise:

receiving bubble sensor data from a bubble sensor, the bubble sensor being fluidically coupled with the reservoir and the organ enclosure; and moving an amount of the second fluid from the reservoir to the organ enclosure, the amount being based on the bubble sensor data.

9. The system as in claim 5 further comprising a perfusion system including:

at least one perfusion pump;

a gas management system including an enclosure configured to expose perfusate to gas;

a thermal management system adjusting a temperature of fluid exiting the gas management system to create thermally-adjusted fluid; and a perfusate reservoir including a fluid enclosure configured to hold the thermally-adjusted fluid destined for the organ, the perfusate reservoir configured to receive perfusate to mix with the thermally-adjusted fluid forming a mixed fluid, the perfusate reservoir including a drain configured to discharge excess thermally-adjusted fluid and/or mixed fluid.

10. The system as in claim 9 further comprising a fluid path including:

at least one venous sensor configured to determine characteristics of venous fluid; and at least one arterial sensor configured to determine characteristics of arterial fluid, wherein the instructions include controlling the perfusion pump, the gas management system, and the thermal management system, the instructions configured to pump the venous fluid from the organ through the gas management system and the thermal management system and into the organ.

11. The system as in claim 9 wherein the perfusion system comprises:

at least one venous fluid sample port.

12. The system as in claim 9 wherein the perfusion system comprises:

at least one venous sensor.

13. The system as in claim 9 wherein the perfusion system comprises:

at least one arterial fluid sample port.

14. The system as in claim 9 wherein the perfusion system comprises:

at least one arterial sensor.

15. The system as in claim 9 wherein the perfusate is a blood-based fluid.

16. The system as in claim 9 wherein the perfusate is oxygen-carrying molecules.

17. The system as in claim 1 further comprising:

a portable enclosure enclosing the actuator, the flexible membrane, and the organ enclosure; and a portable power supply.

18. The system as in claim 9 further comprising:

a portable enclosure enclosing the actuator, the flexible membrane, the organ enclosure, and the perfusion system; and a portable power supply.

* * * * *